(12) United States Patent
DeYoung

(10) Patent No.: US 9,283,480 B2
(45) Date of Patent: Mar. 15, 2016

(54) VIRTUAL COMPETITIVE GROUP MANAGEMENT SYSTEMS AND METHODS

(71) Applicant: Joel DeYoung, Vancouver (CA)

(72) Inventor: Joel DeYoung, Vancouver (CA)

(73) Assignee: Hothead Games, Inc., Vancouver, BC (CA)

( * ) Notice: Subject to any disclaimer, the term of this patent is extended or adjusted under 35 U.S.C. 154(b) by 0 days.

(21) Appl. No.: 14/194,376

(22) Filed: Feb. 28, 2014

(65) Prior Publication Data

US 2014/0179409 A1   Jun. 26, 2014

Related U.S. Application Data

(63) Continuation of application No. 13/761,014, filed on Feb. 6, 2013, now Pat. No. 8,684,820.

(60) Provisional application No. 61/595,530, filed on Feb. 6, 2012.

(51) Int. Cl.
*G06F 17/00* (2006.01)
*A63F 13/30* (2014.01)
*A63F 13/795* (2014.01)
*A63F 13/798* (2014.01)

(52) U.S. Cl.
CPC .............. *A63F 13/12* (2013.01); *A63F 13/795* (2014.09); *A63F 13/798* (2014.09); *A63F 2300/556* (2013.01); *A63F 2300/5566* (2013.01)

(58) Field of Classification Search
USPC .................. 463/6, 7, 9, 13, 23, 26, 28, 40, 41
See application file for complete search history.

(56) References Cited

U.S. PATENT DOCUMENTS

| 5,813,913 A | 9/1998 | Berner et al. |
| 6,174,237 B1 | 1/2001 | Stephenson |
| 6,648,760 B1 | 11/2003 | Nicastro |
| 7,881,976 B2 | 2/2011 | Dayton et al. |
| 8,002,618 B1 * | 8/2011 | Lockton et al. ............ 463/9 |
| 8,149,530 B1 * | 4/2012 | Lockton et al. ............ 360/65 |
| 8,209,628 B1 | 6/2012 | Davidson |

(Continued)

FOREIGN PATENT DOCUMENTS

| CA | 2403006 A1 | 9/2011 |
| CA | 2763349 A1 | 7/2012 |

(Continued)

OTHER PUBLICATIONS

International Search Report and Written Opinion mailed Apr. 15, 2013 in Application No. PCT/US13/024981.

(Continued)

*Primary Examiner* — Ronald Laneau
(74) *Attorney, Agent, or Firm* — Carr & Ferrell LLP

(57) ABSTRACT

Virtual competitive group management systems and methods are provided herein. Exemplary systems may execute methods via one or more processors, which are programmed to compare one or more skill levels of a player to skill levels of a plurality competitors, wherein a skill level is associated with player competitiveness within the interactive game, determine at least one of the plurality of competitors who have at least one skill level that is greater than the skill level of the player, and place the player and the at least one of the plurality of competitors into a competitive group such that the player is at a competitive disadvantage to at least one of the plurality of competitors.

20 Claims, 4 Drawing Sheets

(56) References Cited

U.S. PATENT DOCUMENTS

| | | |
|---|---|---|
| 8,291,492 B2 | 10/2012 | McNally et al. |
| 8,608,485 B2 | 12/2013 | Teasdale et al. |
| 8,645,396 B2 | 2/2014 | McNally et al. |
| 8,684,820 B2 | 4/2014 | Deyoung |
| 9,195,369 B2 | 11/2015 | We et al. |
| 2003/0127798 A1 | 7/2003 | Burrowes |
| 2004/0193484 A1 | 9/2004 | Allen |
| 2005/0282614 A1 | 12/2005 | Gauselmann |
| 2006/0284852 A1 | 12/2006 | Hofmeister et al. |
| 2007/0191101 A1 | 8/2007 | Coliz et al. |
| 2007/0265063 A1 | 11/2007 | McNally |
| 2008/0058092 A1 | 3/2008 | Schwartz et al. |
| 2008/0163055 A1 | 7/2008 | Ganz et al. |
| 2008/0215420 A1 | 9/2008 | Angelica |
| 2008/0228580 A1 | 9/2008 | Korman et al. |
| 2008/0261680 A1 | 10/2008 | Buecheler et al. |
| 2008/0270240 A1 | 10/2008 | Chu |
| 2009/0043868 A1 | 2/2009 | Hathaway |
| 2009/0153389 A1 | 6/2009 | Kerr et al. |
| 2009/0157491 A1 | 6/2009 | Brougher et al. |
| 2009/0165128 A1 | 6/2009 | McNally et al. |
| 2009/0322498 A1 | 12/2009 | Yun et al. |
| 2010/0063993 A1 | 3/2010 | Higgins et al. |
| 2010/0261526 A1 | 10/2010 | Anderson et al. |
| 2010/0268580 A1 | 10/2010 | Vermes |
| 2010/0324981 A1 | 12/2010 | Etchegoyen |
| 2011/0183738 A1 | 7/2011 | Kirnstotter |
| 2011/0184791 A1 | 7/2011 | Wang |
| 2011/0185318 A1 | 7/2011 | Hinckley et al. |
| 2011/0264491 A1 | 10/2011 | Birnbaum et al. |
| 2011/0264532 A1 | 10/2011 | Chan et al. |
| 2011/0300916 A1 | 12/2011 | Patchen |
| 2011/0300923 A1* | 12/2011 | Van Luchene .................. 463/25 |
| 2011/0306428 A1 | 12/2011 | Lockton et al. |
| 2012/0023444 A1 | 1/2012 | Patil et al. |
| 2012/0029990 A1 | 2/2012 | Fisher |
| 2012/0058808 A1 | 3/2012 | Lockton |
| 2012/0109728 A1 | 5/2012 | Sparks |
| 2012/0184349 A1 | 7/2012 | Barclay et al. |
| 2012/0232973 A1 | 9/2012 | Robb et al. |
| 2012/0290308 A1 | 11/2012 | Detwiller et al. |
| 2012/0290654 A1 | 11/2012 | Detwiller et al. |
| 2013/0203480 A1 | 8/2013 | DeYoung |
| 2013/0205255 A1 | 8/2013 | We et al. |
| 2013/0218733 A1 | 8/2013 | Rago et al. |

FOREIGN PATENT DOCUMENTS

| | | |
|---|---|---|
| EP | 2182421 | 5/2010 |
| EP | 2812088 | 12/2014 |
| EP | 2812830 | 12/2014 |
| WO | WO2011019188 | 2/2011 |
| WO | WO 2013/116926 | 8/2013 |
| WO | WO 2013/119702 | 8/2013 |

OTHER PUBLICATIONS

International Search Report and Written Opinion mailed Apr. 15, 2013 in Application No. PCT/US13/000101.

Extended European Search Report mailed Dec. 11, 2014 in European Application No. 13746851.8.

Dix, A., "Deconstructing Experience—pulling crackers apart" in: Blythe Funology: From Usability to Enjoyment, Human-Computer Interaction Series, (Dordecht, the Netherlands: Kluwer, 2003) ISBN 978-1-4020-2967-7, Ch. 13, pp. 165-178.

Extended European Search Report mailed Apr. 16, 2015 in European Application No. 13746523.3.

Office Action mailed Aug. 28, 2015 in Korean Patent Application No. 10-2014-7024906 filed Sep. 4, 2014.

Office Action mailed Nov. 11, 2015 in European Patent Application No. 13746851.8 filed Sep. 3, 2014.

* cited by examiner

VIRTUAL COMPETITIVE GROUP MANAGEMENT SYSTEMS AND METHODS

CROSS REFERENCE TO RELATED APPLICATIONS

This non-provisional patent application claims priority benefit of, and is a continuation of, U.S. patent application Ser. No. 13/761,014, filed on Feb 6, 2013, entitled "Virtual Competitive Group Management Systems and Methods," (issued as U.S. Pat. No. 8,684,820 on Apr. 1, 2014) which claims priority benefit of U.S. Provisional Patent Application Ser. No. 61/595,530, filed on Feb. 6, 2012, entitled "Competitive Groups," all of which are hereby incorporated by reference herein in their entireties including all references cited therein.

FIELD OF THE PRESENT TECHNOLOGY

Embodiments of the present invention include methods in which an interactive game matches players into competitive groups for tournament style competitions of finite length, manages game scheduling and notifications to participants, and provides reward and public recognition for performance amongst other game players as displayed in a rank listing format, in said competitive group during the competition.

BACKGROUND

The facilitation of competitive groups in interactive games is typically an ad hoc process. End users may choose to form teams or other groupings of players, the details of which depend upon the type of interactive game being played. For example, in sports related interactive games, end users may cooperate as a team. In other instances, the system that manages the interactive game may assign players to groups in a random or predetermined manner.

SUMMARY OF THE PRESENT TECHNOLOGY

According to some embodiments, the present technology may be directed to a system that comprises: (a) one or more processors; and (b) logic encoded in one or more tangible media for execution by the one or more processors and when executed operable to perform operations comprising: (i) evaluating one or more skill levels for each of the plurality of players, the one or more skill levels indicative of player performance relative to the interactive game; (ii) comparing the plurality of players to one another using their respective skill levels; and (iii) grouping two or more of the plurality of players together into a competitive group based upon the comparison of skill levels.

According to some embodiments, the present technology may be directed to a system that comprises: (a) one or more processors; and (b) logic encoded in one or more tangible media for execution by the one or more processors and when executed operable to perform operations comprising: (i) comparing one or more skill levels of a player to skill levels of a plurality competitors, wherein a skill level is associated with player competitiveness within the interactive game; (ii) determining at least one of the plurality of competitors who have at least one skill level that is greater than the skill level of the player; and (iii) placing the player and the at least one of the plurality of competitors into a competitive group such that the player is at a competitive disadvantage to at least one of the plurality of competitors.

According to some embodiments, the present technology may be directed to a system that comprises: (a) one or more processors; and (b) logic encoded in one or more tangible media for execution by the one or more processors and when executed operable to perform operations comprising: (i) receiving a selection from a player from the plurality of players, the selection associated with a competitive game mode option in the interactive game; and (ii) assigning the player to one of a plurality of competitive groups, the assignment based upon one or more of a first attribute of the player, a second attribute of a game character associated with the player, and the first and the second attributes of other players from the plurality of players, each of the other players assigned to one competitive group of the plurality of competitive groups.

BRIEF DESCRIPTION OF THE DRAWINGS

Certain embodiments of the present technology are illustrated by the accompanying figures. It will be understood that the figures are not necessarily to scale and that details not necessary for an understanding of the technology or that render other details difficult to perceive may be omitted. It will be understood that the technology is not necessarily limited to the particular embodiments illustrated herein.

DESCRIPTION OF EXEMPLARY EMBODIMENTS

Figure 1:
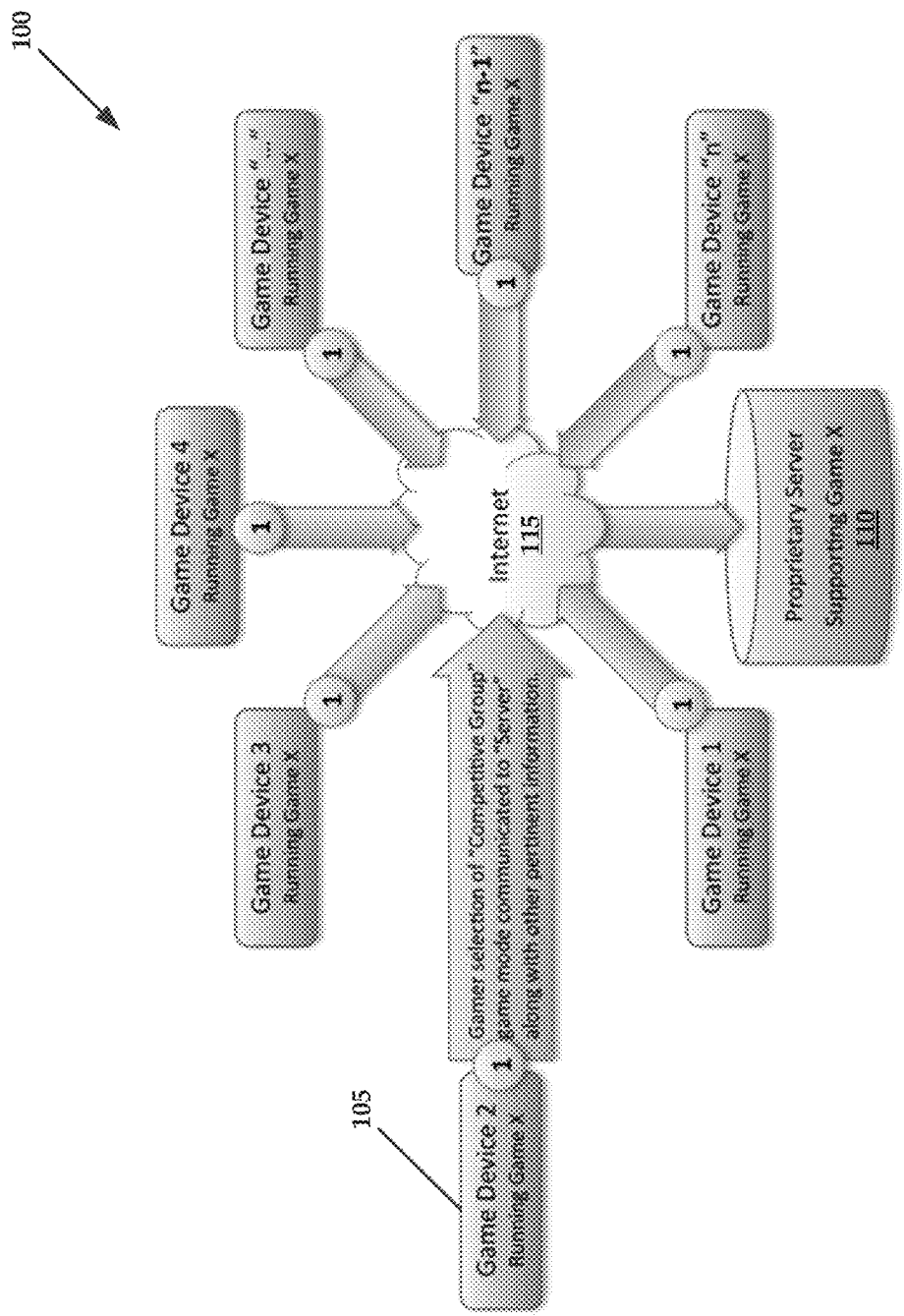
FIG. 1 illustrates a flow diagram of a registration process within a method of assigning competitive groups.

While this technology is susceptible of embodiment in many different forms, there is shown in the drawings and will herein be described in detail several specific embodiments with the understanding that the present disclosure is to be considered as an exemplification of the principles of the technology and is not intended to limit the technology to the embodiments illustrated.

The terminology used herein is for the purpose of describing particular embodiments only and is not intended to be limiting of the present technology. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

It will be understood that like or analogous elements and/or components, referred to herein, may be identified throughout the drawings with like reference characters. It will be further understood that several of the figures are merely schematic representations of the present technology. As such, some of the components may have been distorted from their actual scale for pictorial clarity.

Embodiments of the present invention include methods in which an interactive game matches players into competitive groups for tournament style competitions of finite length, manages game scheduling and notifications to participants, and provides reward and public recognition for performance amongst other game players as displayed in a rank listing format, in said competitive group during the competition.

Embodiments of the present invention match game players into competitive groups based on one or more of the relative skill of the game player and the level and/or attributes of their virtual in-game character or team, in comparison to the relative skill of other game players and the level and/or attributes of their virtual in-game characters or teams that have also elected to compete in the competitive group mode within a game. For clarity, there may be multiple competitive groups created by the embodiments at any given time from the game players that have elected to participate in the competitive group competition mode of a game.

Embodiments of the present invention may yield increased enjoyment, player engagement and player compulsion to improve their skill and the level or attributes of their virtual character or team.

As a game player's skill, or the level and/or attributes of the game player's virtual in-game character or team in the interactive game increases, a game player may be placed into a competitive group with different game players of a similar overall skill level (e.g., dynamic management of competitive groups).

This invention may increase the likelihood of Player enjoyment and engagement due to the tailored competitive field the Player is presented with, the more personalized and finite multiplayer leaderboard ranking system, and the increased competitive nature of the tailored competitive groups. This may encourage Players to improve their actual personal skill level as well as the virtual skill level of their in-game character or team through in-game levelling up or through the purchase of in-game virtual items that improve their character or team.

These and other advantages of the present technology are provided in greater detail with reference to the drawings.

FIG. 1 is a block diagram of an exemplary architecture 100 in which embodiments of the present technology may be practiced. According to some embodiments, the architecture 100 may comprise a client device 105, which in some instances may comprise an end user computing device, a mobile computing device, or any other device capable of displaying graphical user interfaces and allowing an end user to interact with such GUIs.

The client device 105 may be communicatively coupled with a Proprietary Server Supporting Game X, hereinafter referred to as "server 110" via a network 115. The Game X referred to with respect to the server 110 may include any interactive game that supports the use of group player features. It will be understood that the network 115 may comprise any a local area network ("LAN"), a wide area network ("WAN"), or any other private or public network, such as the Internet. The network 115 may also comprise a telecommunications network.

Figure 4:
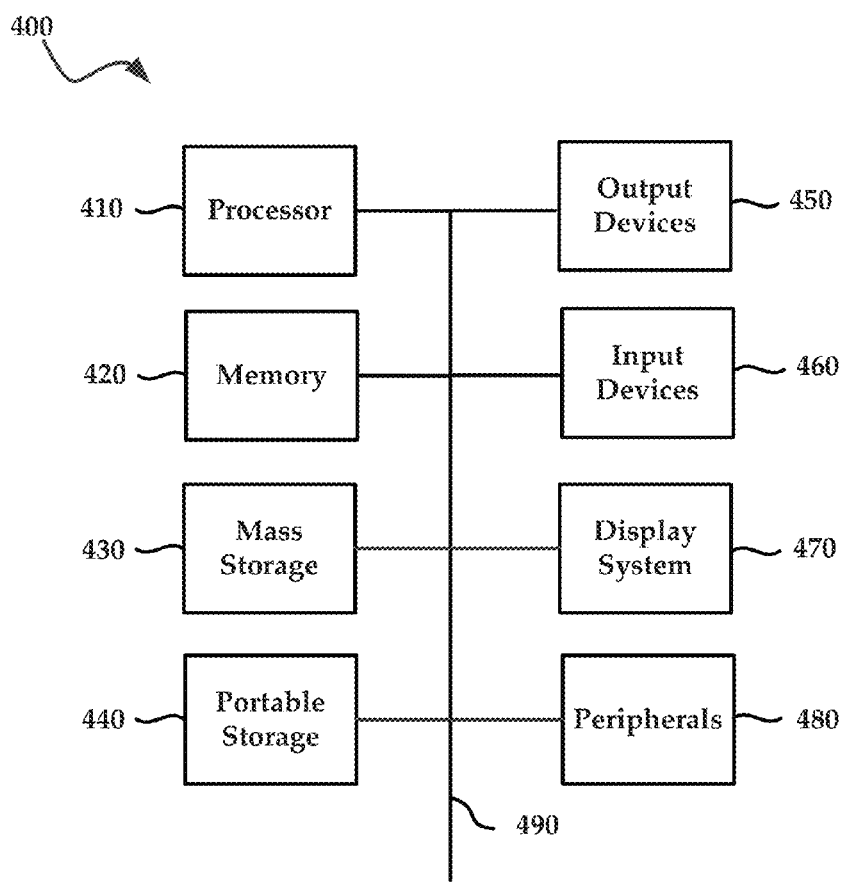
FIG. 4 illustrates an exemplary computing device that may be used to implement embodiments according to the present technology.

According to some embodiments, the server 110 may comprise any computing device, such as the computer system 400 of FIG. 4. The server 110 includes one or more processors such as the one or more processors 410 of FIG. 4, and memory for storing executable instructions (e.g., logic) such as the main memory 420 of computer system 400 of FIG. 4. This logic, when executed by the one or more processors, is operable to perform operations, including the exemplary methods described herein.

In some instances, the functions of the server 110 may be implemented within a cloud-based computing environment. In general, a cloud-based computing environment is a resource that typically combines the computational power of a large model of processors and/or that combines the storage capacity of a large model of computer memories or storage devices. For example, systems that provide a cloud resource may be utilized exclusively by their owners; or such systems may be accessible to outside users who deploy applications within the computing infrastructure to obtain the benefit of large computational or storage resources.

The cloud may be formed, for example, by a network of servers, with each server (or at least a plurality thereof) providing processor and/or storage resources. These servers may manage workloads provided by multiple users (e.g., cloud resource consumers or other users). Typically, each user places workload demands upon the cloud that vary in real-time, sometimes dramatically. The nature and extent of these variations typically depend on the type of business associated with the user.

According to some embodiments, the server 110 may include logic that when executed provides for any of match making game players (the "Players"), playing an interactive entertainment software application (the "Game"), into designated groups of competitive Players (the "Competitive Groups"). In some instances, each Competitive Group may comprise a subset of, and are selected from, the overall total number of Players that are playing the Game and that have selected to play a specific competitive multiplayer gameplay mode within the Game (the "Competitive Players"). In other words, the groups may be smaller than the size of the entire gaming population.

The server 110 may match a Competitive Player with other Competitive Players in the Competitive Groups based upon a match-making process (the "Process") where the server 110 matches the Competitive Players according to one or more criteria. For example, the server 110 may match Competitive Players based upon a skill level of each of the Competitive Players, and a skill level of the Competitive Player's team and/or a character within the Game, with which the Competitive Player may compete within the Game.

In some instances, the server 110 may transparently match the Competitive Players into Competitive Groups that may likely provide one or more advantages. In some instances, the server 110 may place a Competitive Player in a Competitive Group within which the Competitive Player may more likely be required and inclined to purchase in-game items to be competitive with the other Players within the Competitive Group.

That is, the one or more processors of the server 110 may execute logic to compare one or more skill levels of a Player to skill levels of a plurality other Competitive Players. It will be understood that a skill level is associated with player competitiveness within the interactive game. Generally, a "skill level" may relate to a likelihood that the Competitive Player will be successful at a given task or activity within the interactive game. For example, the likelihood of success for a Competitive Player in an interactive game that facilitates hand-to-hand combat between Competitive Players may be directly related to the strength and/or agility of the Competitive Player in comparison to other Competitive Players. In other instances the likelihood of success for a likelihood of success Competitive Player may be determine from past game play. One of ordinary skill in the art will appreciate that skill levels and "likelihood of success" depend in great deal upon the parameters of the interactive game and the behaviors of the players.

The server 110 may be further configured to determine at least one of the plurality of competitors who have at least one skill level that is greater than the skill level of the player. Additionally, the server 110 may be configured to place the player and the at least one of the plurality of competitors into a competitive group such that the player is at a competitive disadvantage to at least one of the plurality of competitors.

As the Player's skill and/or level of their team and/or character in the Game increases, the Player may more likely be matched with different and more skilled competitors (e.g., dynamic management of Competitive Groups).

As each Competitive Group is created, games may be scheduled or simply recommended or encouraged to take place amongst the Competitive Players within the group by logic on the Server communicating with the Competitive Players via the local version of the Game on their Game Device. When the Competitive Players within a Competitive Group play games amongst one another the results are tracked and communicated by the Server to each of the Players playing the Game, or a subset thereof, via the Internet. According to the rules of the Game and the competition determined for the Competitive Group a winner will be determined by the Server and publicized/communicated by the Server to each of the Players playing the Game, or a subset thereof, via the internet or other wired and/or wireless network.

Advantageously, the creation of Competitive Groups may also increase the enjoyment and engagement of the Competitive Player due to the increased competitive nature/result of the Game experienced in the Competitive Groups, increasing the likelihood of repeated play of the Game by the Player.

By way of non-limiting example, assume that a Player is playing the Game on a local game device, which could be, but is not limited to, a smartphone, tablet, personal computer either laptop or desktop, hand held gaming device such as the PlayStation Portable, Nintendo Dual Screen, or any other similar device in existence today or invented in the future on which interactive games are played (a "Game Device"). Within The Game, the Player selects to compete in the Competitive Group game mode. The local instance of the Game running on a Game Device then communicates with the server 110 that resides somewhere on the Internet and communicates over the network 115 with multiple game devices playing the Game (the "Server").

The server 110 is notified by the local instance of the Game that the Player is interested in becoming a Competitive Player and competing in a Competitive Group against other Competitive Players. The server 110 receives information about the Player that allows the server 110 to execute the above-described group assignment logic and determine which other Competitive Players to match the Player with to create a Competitive Group. The server 110 may receive one or more of the following pieces of information used initiate and run the assignment process. The server 110 may receive a Player unique identifier code, statistics on Player's skill level of success rate against other Players or the Game's artificial intelligence, the Player's team and/or character level and attributes. The server 110 may only receive the Player's unique identifier to the Server and all other key information about the Player may be kept up to date on the Server by the Game.

The server 110, once it has received the pertinent information from the local instance of the Game on the Game Device, may then register the Player as a Competitive Player and match the new Competitive Player with other Competitive Players of similar skill level in a Competitive Group for competitive play. The server 110 may provide the local instance of the Game with the information pertaining to this Competitive Group, including details on the other Competitive Players within the group and any and all other data required or deemed necessary to inform the Competitive Players about the adversaries and the competition in which they have agreed to compete. The local instance of the Game on the Game Device may display this information to the Competitive Player, such that the Competitive Player could determine the level of his competition in the Competitive Group and adjust or improve his team accordingly according to the rules of The Game.

For clarity, at any given time there may be multiple Competitive Groups created by the server 110 that contain multiple competing Competitive Players. The number of Competitive Groups may depend on the total number of Players that have decided to become Competitive Players combined with the optimal number of Competitive Players determined to be required in each Competitive Group.

According to the criteria set on the server 110 and in the Game, the server 110 may frequently communicate back and forth with the local instance of the Game on the Game Device to set-up, track results, and communicate the results of competitive games between the Competitive Players in the Competitive Group and based on the rules of the Game and the competition that have been predetermined, the server 110 may declare a winner of the competition in the Competitive Group and provide all the Competitive Players within this group, and possibly to all Players playing the Game, a notification of who won the competition in the Competitive Group.

For clarity, at any given time there may be multiple Competitive Groups created by the server 110 that contain multiple competing Competitive Players. Additionally, the Game may be facilitated entirely on the server 110 where the end user devices interact with the Game via a web browser client.

As shown in greater detail in FIG. 1, multiple Players on multiple local Game Devices running the Game may select the Competitive Game Mode option within the Game over a period of time. Each Game Device running the Game may communicate this event and associated data to the server 110. Game Devices sending this step of information to the Proprietary Game Server may trigger this event asynchronously. For clarity, Game Device 1 might send this event to the server 110 several units of time after or before Game Device 2.

Figure 2:
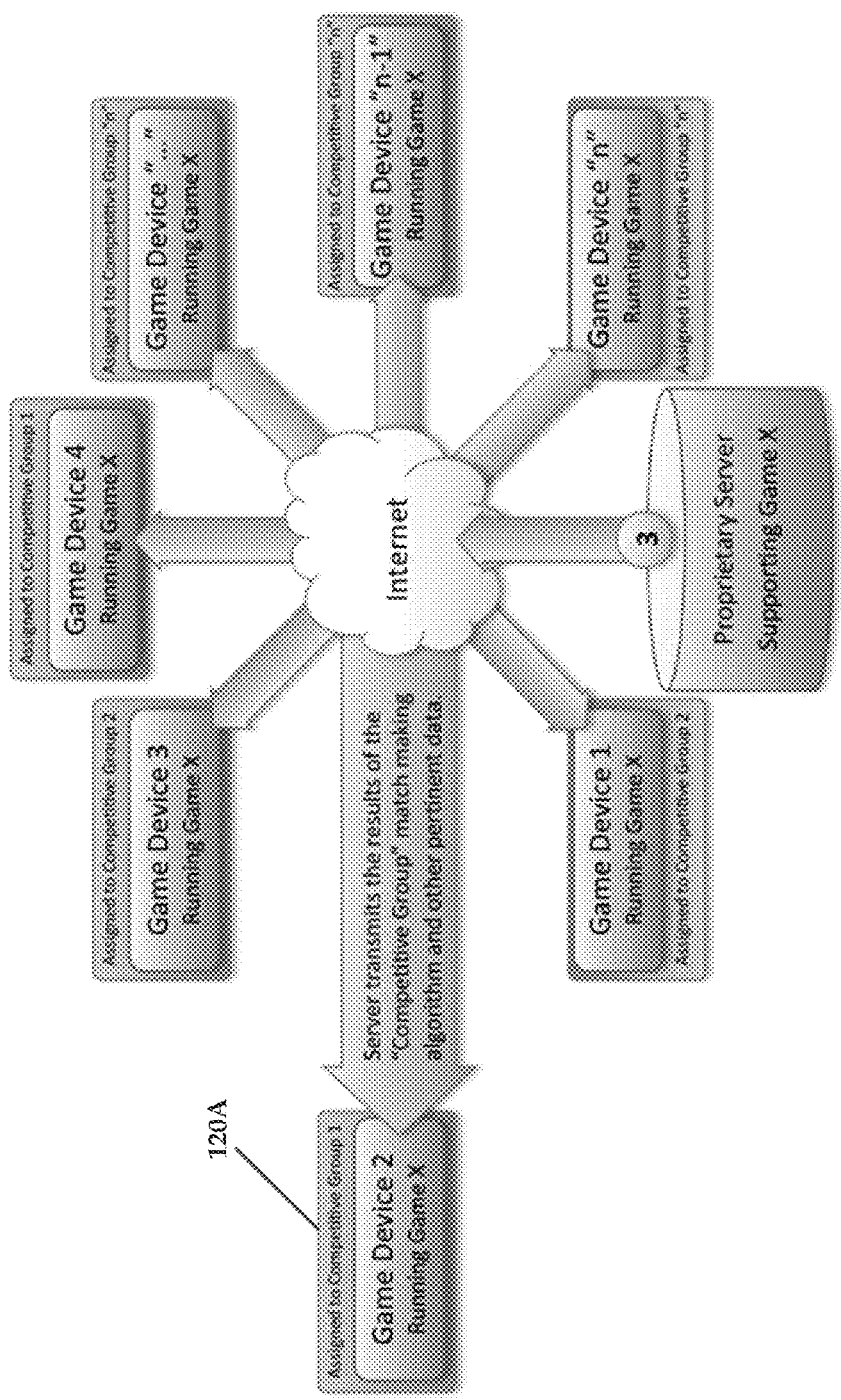
FIG. 2 illustrates a flow diagram of a results transmission process within a method of assigning competitive groups.

FIG. 2 illustrates the server 110 assigning each of the Players that have elected to become a Competitive Player into Competitive Groups. For clarity, this Process may be performed each and every time a request from a Player to become a Competitive Player occurs. Players may be added to Competitive Groups over time, or in some embodiments, the server 110 could wait a period of time up until a deadline and then process the Competitive Player requests that have been received prior to the deadline. The order and process followed for these steps outlined may vary depending on what is determined to be optimal the particular Game within which it is utilized or the parameters decided upon for the particular rules that are to be applied for the competition within which the Competitive Groups will compete.

Figure 3:
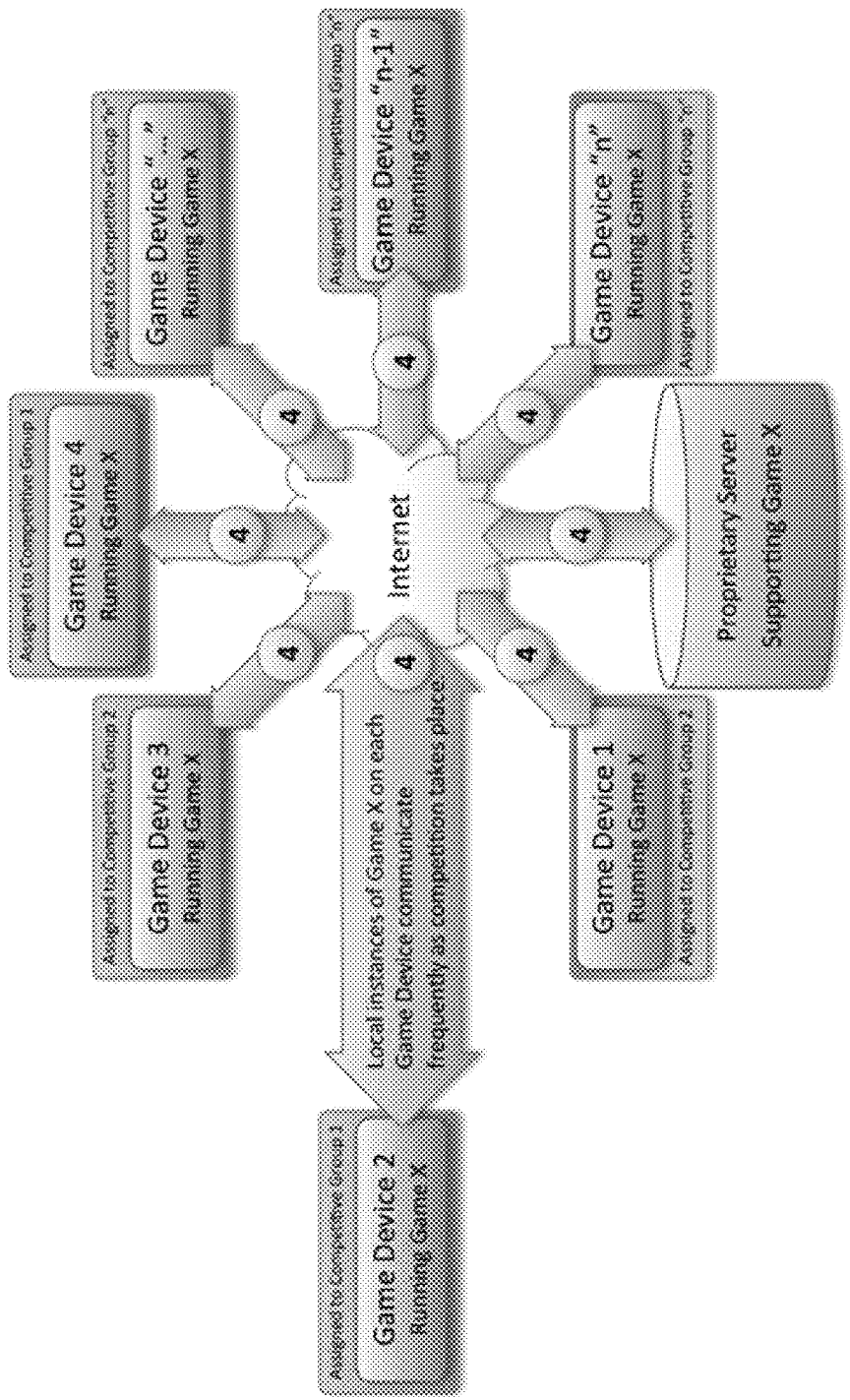
FIG. 3 illustrates an exchange of information between a local instance of an interactive game and a server instance of the interactive game.

FIG. 3 illustrates instances where the server 110 provides the local instance of the Game on each of the Game Devices with the information pertaining to the Competitive Group that each Player has been assigned, as well as other details that may include, but are not limited to information on the other Competitive Players within the group, and any and all other data required or deemed necessary to inform the Competitive Players about the adversaries and the competition in which they have agreed to compete. The local instance of the Game on the Game Device may display this information to the Competitive Player, such that the Competitive Player could determine the level of his competition in the Competitive Group and adjust or improve his team accordingly according to the rules of The Game.

According to the criteria set on the server 110 and in The Game, the server 110 may frequently communicate back and forth with the local instance of the Game on the Game Device to set-up, track results, and communicate the results of competitive games between the Competitive Players in the Competitive Group based on the rules of the Game and the competition that have been predetermined, the server 110 may declare a winner of the competition in the Competitive Group and may provide all the Competitive Players within this group, and possibly to all Players playing The Game, a notification of who won the competition in the Competitive Group.

FIG. 4 illustrates an exemplary computing device 400 that may be used to implement an embodiment of the present systems and methods. The system 400 of FIG. 4 may be implemented in the contexts of the likes of computing devices, networks, servers, or combinations thereof. The computing device 400 of FIG. 4 includes one or more processors 410 and main memory 420. Main memory 420 stores, in part, instructions and data for execution by processor 410. Main memory 420 may store the executable code when in operation. The system 400 of FIG. 4 further includes a mass storage device 430, portable storage device 440, output devices 450, user input devices 460, a display system 470, and peripheral devices 480.

The components shown in FIG. 4 are depicted as being connected via a single bus 490. The components may be connected through one or more data transport means. Processor unit 410 and main memory 420 may be connected via a local microprocessor bus, and the mass storage device 430, peripheral device(s) 480, portable storage device 440, and display system 470 may be connected via one or more input/output (I/O) buses.

Mass storage device 430, which may be implemented with a magnetic disk drive or an optical disk drive, is a non-volatile storage device for storing data and instructions for use by processor unit 410. Mass storage device 430 may store the system software for implementing embodiments of the present technology for purposes of loading that software into main memory 420.

Portable storage device 440 operates in conjunction with a portable non-volatile storage medium, such as a floppy disk, compact disk, digital video disc, or USB storage device, to input and output data and code to and from the computer system 400 of FIG. 4. The system software for implementing embodiments of the present technology may be stored on such a portable medium and input to the computer system 400 via the portable storage device 440.

User input devices 460 provide a portion of a user interface. User input devices 460 may include an alphanumeric keypad, such as a keyboard, for inputting alpha-numeric and other information, or a pointing device, such as a mouse, a trackball, stylus, or cursor direction keys. Additional user input devices 460 may comprise, but are not limited to, devices such as speech recognition systems, facial recognition systems, motion-based input systems, gesture-based systems, and so forth. For example, user input devices 460 may include a touchscreen. Additionally, the system 400 as shown in FIG. 4 includes output devices 450. Suitable output devices include speakers, printers, network interfaces, and monitors.

Display system 470 may include a liquid crystal display (LCD) or other suitable display device. Display system 470 receives textual and graphical information, and processes the information for output to the display device.

Peripherals device(s) 480 may include any type of computer support device to add additional functionality to the computer system. Peripheral device(s) 480 may include a modem or a router.

The components provided in the computer system 400 of FIG. 4 are those typically found in computer systems that may be suitable for use with embodiments of the present technology and are intended to represent a broad category of such computer components that are well known in the art. Thus, the computer system 400 of FIG. 4 may be a personal computer, hand held computing device, telephone, mobile computing device, workstation, server, minicomputer, mainframe computer, or any other computing device. The computer may also include different bus configurations, networked platforms, multi-processor platforms, etc. Various operating systems may be used including Unix, Linux, Windows, Mac OS, Palm OS, Android, iOS (known as iPhone OS before June 2010), QNX, and other suitable operating systems.

It is noteworthy that any hardware platform suitable for performing the processing described herein is suitable for use with the systems and methods provided herein. Computer-readable storage media refer to any medium or media that participate in providing instructions to a central processing unit (CPU), a processor, a microcontroller, or the like. Such media may take forms including, but not limited to, non-volatile and volatile media such as optical or magnetic disks and dynamic memory, respectively. Common forms of computer-readable storage media include a floppy disk, a flexible disk, a hard disk, magnetic tape, any other magnetic storage medium, a CD-ROM disk, digital video disk (DVD), any other optical storage medium, RAM, PROM, EPROM, a FLASHEPROM, any other memory chip or cartridge.

Computer program code for carrying out operations for aspects of the present technology may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be coupled with the user's computer through any type of network, including a local area network (LAN) or a wide area network (WAN), or the connection may be made to an external computer (for example, through the Internet using an Internet Service Provider).

The corresponding structures, materials, acts, and equivalents of all means or step plus function elements in the claims below are intended to include any structure, material, or act for performing the function in combination with other claimed elements as specifically claimed. The description of the present technology has been presented for purposes of illustration and description, but is not intended to be exhaustive or limited to the present technology in the form disclosed. Many modifications and variations will be apparent to those of ordinary skill in the art without departing from the scope and spirit of the present technology. Exemplary embodiments were chosen and described in order to best explain the principles of the present technology and its practical application, and to enable others of ordinary skill in the art to understand the present technology for various embodiments with various modifications as are suited to the particular use contemplated.

Aspects of the present technology are described above with reference to flowchart illustrations and/or block diagrams of methods, apparatus (systems) and computer program products according to embodiments of the present technology. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods and computer program products according to various embodiments of the present technology. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

While various embodiments have been described above, it should be understood that they have been presented by way of example only, and not limitation. The descriptions are not intended to limit the scope of the technology to the particular forms set forth herein. Thus, the breadth and scope of a preferred embodiment should not be limited by any of the above-described exemplary embodiments. It should be understood that the above description is illustrative and not restrictive. To the contrary, the present descriptions are intended to cover such alternatives, modifications, and equivalents as may be included within the spirit and scope of the technology as defined by the appended claims and otherwise appreciated by one of ordinary skill in the art. The scope of the technology should, therefore, be determined not with reference to the above description, but instead should be determined with reference to the appended claims along with their full scope of equivalents.

What is claimed is:

1. A system for assigning a plurality of game devices to competitive groups in an online interactive game, the system comprising:

one or more processors; and logic encoded in one or more tangible media for execution by one or more servers and when executed operable to perform operations comprising:

receiving, from a game device that is executing a local instance of an online interactive game, an asynchronous notification of a selection of a competitive game mode option by a user during a predetermined period of time;

evaluating one or more virtual skill levels for a character of each game device of a competitive group of game devices, each game device executing a local instance of the online interactive game, the one or more virtual skill levels indicative of character performance relative to performance of others of the plurality of characters in the online interactive game;

comparing the plurality of characters to one another using their respective virtual skill levels;

adding the game device to the competitive group of game devices to become one of the competitive group of game devices;

communicating game results back and forth between the competitive group of game devices to track the game results of the local instance of the online interactive game executing on the game devices of the competitive group of game devices; and communicating the tracked game results back and forth between the competitive group of game devices executing the local instance of the online interactive game.

2. The system according to claim 1, wherein the competitive group of game devices includes a team created to compete against multiple competitive groups in a competitive group competition mode in the online interactive game.

3. The system according to claim 1, wherein the one or more virtual skill levels of each character is based on purchased in-game virtual items.

4. The system according to claim 1, wherein the one or more virtual skill levels of each character is based on an attribute of the character.

5. The system according to claim 4, wherein the attribute is agility of the character.

6. The system according to claim 1, wherein the competitive group of game devices is a team.

7. The system according to claim 1, further comprising matching characters of the plurality of characters of the competitive group of game devices based upon a skill level of each of the characters.

8. A system for assigning a game device to a competitive group in an online interactive game, the system comprising:

one or more server processors; and logic encoded in one or more tangible media for execution by the one or more server processors and when executed operable to perform operations comprising:

receiving, from a first game device that is executing a local instance of an online interactive game, a notification of a selection of a competitive game mode options;

comparing a skill level of a character of the first game device to skills levels of each character of a competitive group of game devices executing a local instance of the online interactive game;

if at least one of the characters of the competitive group of game devices has a skill level that is greater than the skill level of the character of the first game device, adding the first game device to the competitive group of game devices to become one of the competitive group of game devices;

communicating results back and forth between the competitive group of game devices, including the first game device, to track results of the local instance of the online interactive game executing on the game devices of the competitive group; and communicating the tracked results back and forth between the game devices of the competitive group, including the first game device.

9. The system according to claim 8, wherein the skill level of each character is based on purchased in-game virtual items.

10. The system according to claim 8, wherein the skill level of each character is based on an attribute of the character.

11. The system according to claim 10, wherein the attribute is agility of the character.

12. The system according to claim 8, wherein the logic when executed is further operable to perform operations comprising matching two or more competitive groups in competition within the online interactive game.

13. The system according to claim 12, wherein each character is a team.

14. A method comprising:
evaluating, using a server, a virtual skill level for a character of each of a plurality of game devices executing a local instance of an online interactive game;

comparing, at the server, the evaluated virtual skill levels of the characters to one another;

grouping two or more of the plurality of game devices together into a competitive group in the online interactive game based upon the comparison of the evaluated virtual skill levels of the characters; and communicating, via the server results in real time back and forth between the competitive group of game devices to track results of the local instance of the online interactive game executing on the game devices of the competitive group.

15. The method according to claim 14, wherein the skill level of each character is based on purchased in-game virtual items.

16. The method according to claim 14, wherein the skill level of each character is based on an attribute of the character.

17. The method according to claim 16, wherein the attribute is strength of the character.

18. The method according to claim 16, wherein the attribute is agility of the character.

19. The method according to claim 14, wherein the skill level of each character is based on likelihood of success.

20. The method according to claim 14, wherein the skill level of each character is based on likelihood of success determined from past game play.

* * * * *